(12) United States Patent
Carr et al.

(10) Patent No.: US 7,728,550 B2
(45) Date of Patent: Jun. 1, 2010

(54) INTEGRATED CMOS DC-DC CONVERTER IMPLEMENTATION IN LOW-VOLTAGE CMOS TECHNOLOGY USING LDO REGULATOR

(75) Inventors: Frank Carr, New Coast, CA (US); Ahmed A. Emira, Lake Forest, CA (US); Hassan Elwan, Lake Forest, CA (US)

(73) Assignee: Newport Media, Inc., Lake Forest, CA (US)

( * ) Notice: Subject to any disclaimer, the term of this patent is extended or adjusted under 35 U.S.C. 154(b) by 492 days.

(21) Appl. No.: 11/780,539

(22) Filed: Jul. 20, 2007

(65) Prior Publication Data
US 2009/0021228 A1 Jan. 22, 2009

(51) Int. Cl.
*H01M 10/46* (2006.01)
(52) U.S. Cl. .................. 320/107; 323/266; 323/282
(58) Field of Classification Search .......... 320/103, 320/106, 107, 111, 113, 114, 128, 137, 139, 320/140, 141; 323/222, 266, 282, 281
See application file for complete search history.

(56) References Cited

U.S. PATENT DOCUMENTS

| | | | | |
|---|---|---|---|---|
| 5,796,982 | A * | 8/1998 | Iwami et al. ............. | 703/18 |
| 6,188,211 | B1 * | 2/2001 | Rincon-Mora et al. ..... | 323/280 |
| 6,864,664 | B2 * | 3/2005 | Clift ......................... | 320/128 |
| 6,897,635 | B2 * | 5/2005 | Ozawa et al. ............. | 320/127 |
| 7,253,596 | B2 * | 8/2007 | Yamamoto et al. ........ | 323/281 |
| 7,378,823 | B2 * | 5/2008 | Yamanaka et al. ........ | 323/267 |
| 2005/0151525 | A1 * | 7/2005 | Komori et al. ............ | 323/282 |
| 2005/0189909 | A1 * | 9/2005 | Guthrie et al. ........... | 320/107 |
| 2007/0146477 | A1 * | 6/2007 | Lee ......................... | 348/14.01 |

FOREIGN PATENT DOCUMENTS

| | | | |
|---|---|---|---|
| JP | 2003-009515 | A | 1/2003 |
| JP | 2005-124269 | A | 5/2005 |
| JP | 2005-130622 | A | 5/2005 |
| KR | 10-2001-0028010 | A | 4/2001 |
| KR | 10-2004-0069081 | A | 8/2004 |

OTHER PUBLICATIONS

S. Reynolds, "A DC-DC Converter for Short-Channel CMOS Technologies," IEEE Journal of Solid-State Circuits, vol. 32, No. 1, Jan. 1997, pp. 111-113.

* cited by examiner

*Primary Examiner*—Edward Tso
*Assistant Examiner*—M'Baye Diao
(74) *Attorney, Agent, or Firm*—Rahman LLC

(57) ABSTRACT

An electrical circuit and method of power management of a cellular telephone includes a battery adapted to produce a battery voltage; a LDO regulator operatively connected to the battery and adapted to provide a constant supply voltage from the battery voltage; and a DC-DC converter operatively connected to the LDO regulator, wherein the DC-DC converter is adapted to step down the constant supply voltage to a lower voltage level, wherein the LDO regulator and the DC-DC converter are embedded on a single integrated circuit chip. The constant supply voltage equals 3.6V at an output of the LDO, and the constant supply voltage is applied to an input of the DC-DC converter. Moreover, the battery voltage equals at most 5.5V.

20 Claims, 5 Drawing Sheets

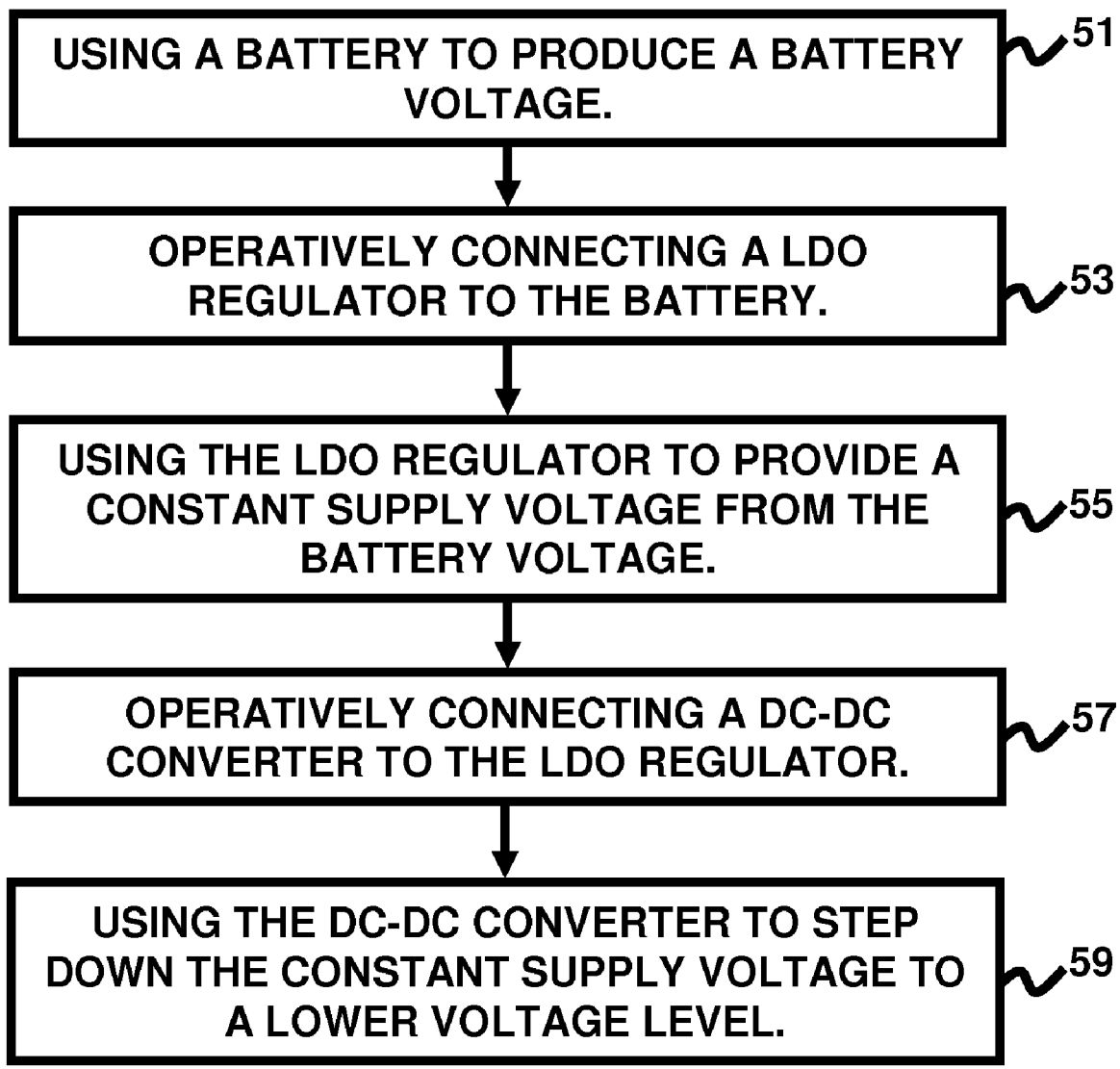

INTEGRATED CMOS DC-DC CONVERTER IMPLEMENTATION IN LOW-VOLTAGE CMOS TECHNOLOGY USING LDO REGULATOR

BACKGROUND

1. Technical Field

The embodiments herein generally relate to complementary metal oxide semiconductor integrated circuit (CMOS IC) technologies, and, more particularly, to power management systems used in CMOS IC technologies.

2. Description of the Related Art

In modern CMOS IC technologies, as MOS transistor oxide thickness scales down, the breakdown voltage becomes lower. The scaling breakdown voltage makes the circuit design challenging especially in portable applications such as cell phones where battery voltage does not scale down. Voltage regulators are used to regulate the battery voltage down to a level which is suitable for the CMOS technology used. DC-DC converters are typically used because of their good efficiency versus low dropout (LDO) regulators. In cell phone applications, the battery voltage is normally 3.6V. With a careful design, it is possible to implement an integrated CMOS DC-DC converter with 3.6V input in 0.13 um CMOS technology. However, when the battery is being charged, the voltage can increase to 4.2V and sometimes to 5.5V in pulse-mode chargers. Moreover, it is difficult to design the integrated CMOS DC-DC converter that operates from this high input voltage.

There are two alternative solutions that are currently being used. The first solution is to use a discrete DC-DC converter that is built using technology that tolerates high operating voltages. The size and cost of such a solution tends to be relatively high. The second solution is to use system-in-package (SIP) technology to reduce the size of the overall system. However, SIP solutions tend to have a large size, and high cost (due to packaging complexity in SIP), and low yield. The conventional synchronous design of a DC-DC converter is shown in FIG. 1. When the input is 0V, the NMOS switch is OFF and the PMOS switch is ON, then Vdg of the NMOS is at 3.6V which can easily destroy the device. Therefore, using a single NMOS and PMOS switch is not possible for the 3.6V level in this technology that has devices rated at much lower operating voltages. Accordingly, there remains a need for a converter capable of properly regulating battery voltage levels in a cellular telephone.

SUMMARY

In view of the foregoing, an embodiment herein provides an electrical circuit comprising a battery adapted to produce a battery voltage; a LDO regulator operatively connected to the battery and adapted to provide a constant supply voltage from the battery voltage; and a DC-DC converter operatively connected to the LDO regulator, wherein the DC-DC converter is adapted to step down the constant supply voltage to a lower voltage level, which is suitable for the CMOS technology used, wherein the LDO regulator and the DC-DC converter are embedded on a single integrated circuit chip. The constant supply voltage equals 3.6V at an output of the LDO, and the constant supply voltage is applied to an input of the DC-DC converter. Moreover, the battery voltage equals at most 5.5V which occurs when the battery is being charged. The LDO serves to keep the input voltage to the DC-DC Converter at 3.6V. The efficiency in this case is low because of the large voltage drop across the LDO switch (5.5 V−3.6 V=1.9V). However, this is not an issue because the battery is being charged. In other words, it does not affect the battery lifetime. Preferably, the DC-DC converter comprises a pair of CMOS switches and a pulse width modulator (PWM) adapted to provide pulse signals to drive the CMOS switches.

Another embodiment provides a communications system comprising an alternating (AC) source; a battery charger; and a cellular telephone comprising a battery adapted to produce a battery voltage; and a single system on-chip (SoC) integrated circuit chip comprising a LDO regulator operatively connected to the battery and adapted to provide a constant supply voltage from the battery voltage; and a DC-DC converter operatively connected to the LDO regulator, wherein the DC-DC converter is adapted to step down the constant supply voltage to a lower voltage level with high efficiency. Moreover, the constant supply voltage equals 3.6V at an output of the LDO, and wherein the constant supply voltage is applied to an input of the DC-DC converter. Also, the battery voltage equals at most 5.5V when the battery charger is plugged into the AC source. Preferably, the DC-DC converter comprises a pair of CMOS switches and a PWM adapted to provide pulse signals to drive the CMOS switches.

Another embodiment provides a method of performing power management of a cellular telephone, wherein the method comprises using a battery to produce a battery voltage; operatively connecting a LDO regulator to the battery; using the LDO regulator to provide a constant supply voltage from the battery voltage; operatively connecting a DC-DC converter to the LDO regulator; and using the DC-DC converter to step down the constant supply voltage to a lower voltage level, wherein the LDO regulator and the DC-DC converter are embedded on a single integrated circuit chip. Furthermore, the constant supply voltage equals 3.6V at an output of the LDO, and wherein the constant supply voltage is applied to an input of the DC-DC converter. Moreover, the battery voltage equals at most 5.5V in the cellular telephone. The method further comprises attaching the cellular telephone to a battery charger; and attaching the battery charger to an AC source, wherein the cellular telephone is adapted to be in the power-down mode while the battery charger is plugged to the AC source. Preferably, the DC-DC converter comprises a pair of CMOS switches and a PWM adapted to provide pulse signals to drive the CMOS switches.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a flow diagram illustrating a preferred method according to an embodiment herein.

DETAILED DESCRIPTION OF PREFERRED EMBODIMENTS

Figure 1:
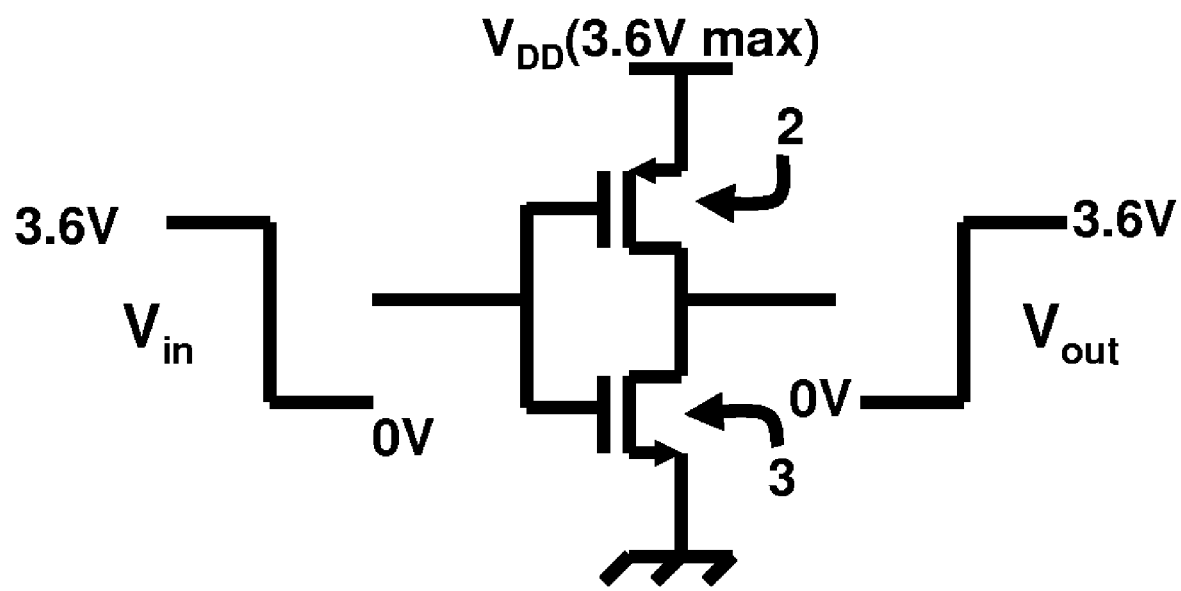
FIG. 1 illustrates a schematic diagram of a conventional DC-DC converter.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a converter capable of properly regulating battery voltage levels in a cellular telephone. The embodiments herein achieve this by providing a new technique to implement a DC-DC converter in low-voltage CMOS technology. Referring now to the drawings, and more particularly to FIGS. 2 through 5, where similar reference characters denote corresponding features consistently throughout the figures, there are shown preferred embodiments.

Figure 2:
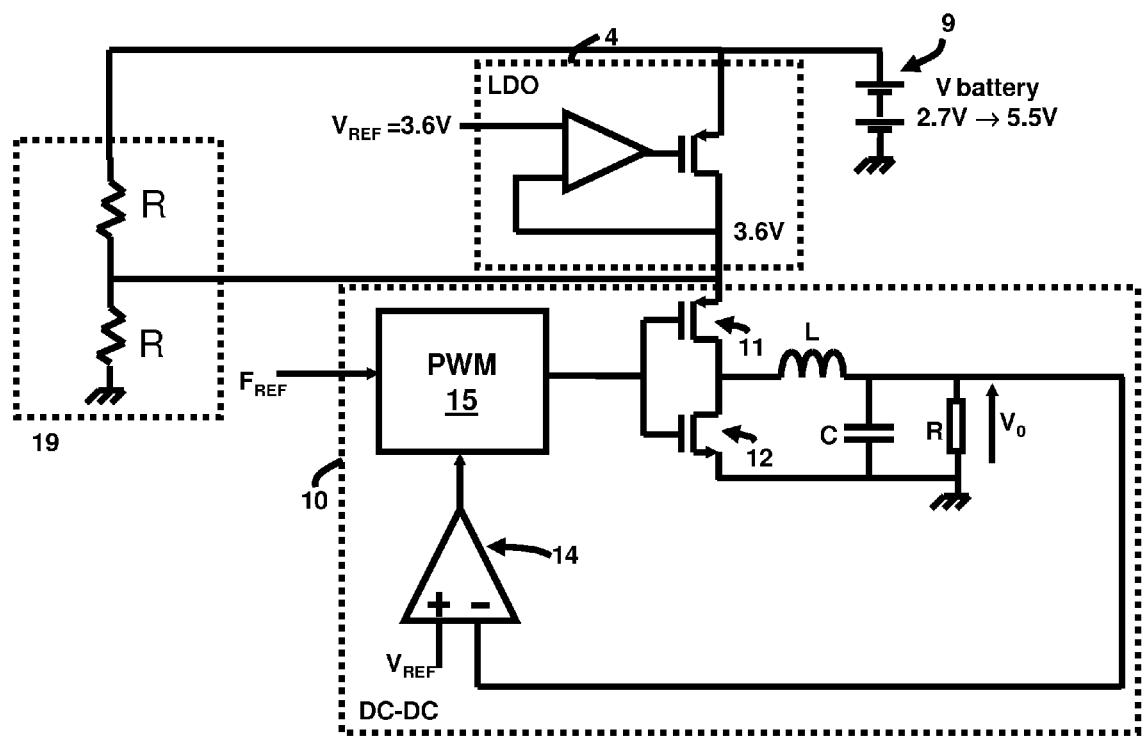
FIG. 2 illustrates a schematic diagram of an electrical circuit according to an embodiment herein.
Figure 3:
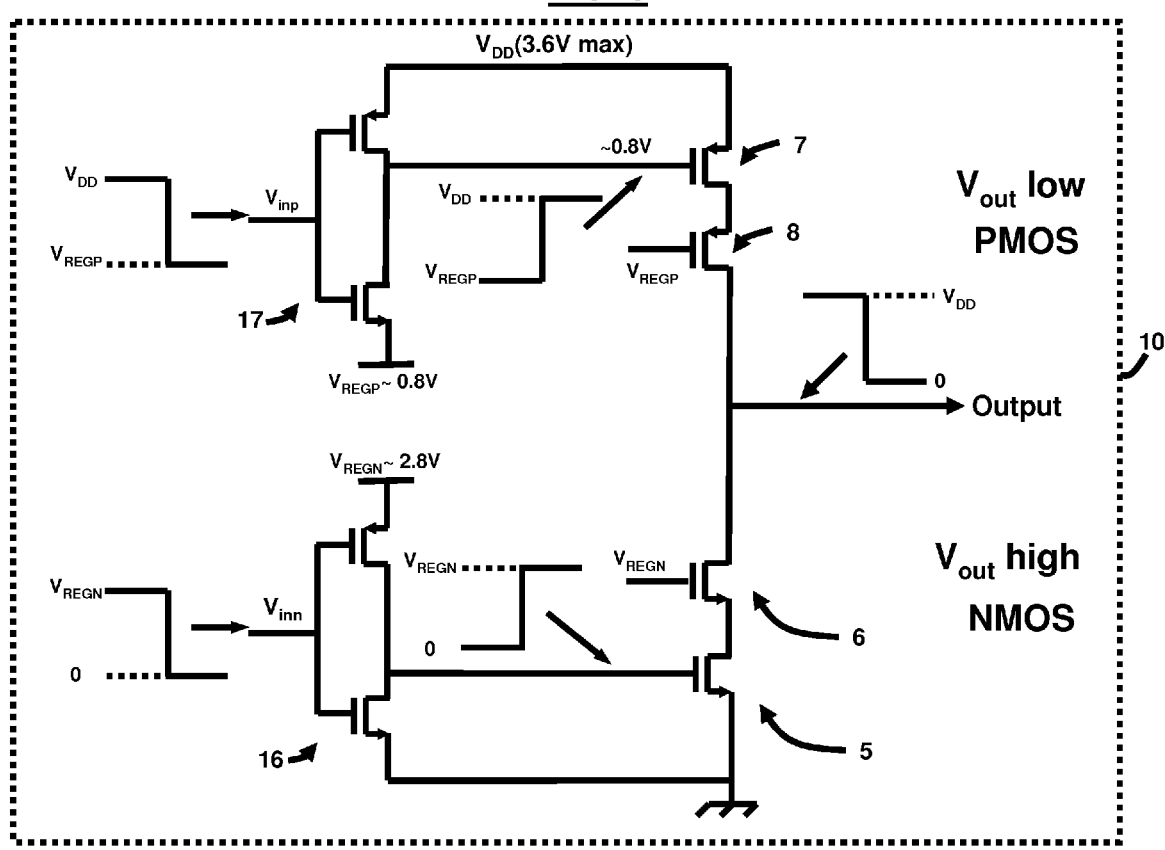
FIG. 3 illustrates a schematic diagram of the DC-DC converter of the electrical circuit of FIG. 2 according to an embodiment herein.

FIG. 2 illustrates an electrical circuit 1 in accordance with the embodiments herein. The LDO 4 generates 3.6V at its output which is applied to the input of the DC-DC converter 10. The output of the DC-DC converter 10 is compared with a reference voltage $V_{ref}$ and an amplifier 14 amplifies the error signal. The amplified error signal is then used to control the duty cycle at the output of the PWM generator 15. Even with the 3.6V, the design of the DC-DC converter 10 is not trivial since breakdown of the CMOS devices used is typically at 2.8V. A circuit diagram of the DC-DC converter 10 of FIG. 2 is shown in FIG. 3. Two series PMOS switches 7, 8 replace the PMOS switch 2 in FIG. 1. Similarly, two series NMOS switches 5, 6 replace the NMOS switch 3 in FIG. 1. Voltage levels at the gates of all switches 5-8 are well-controlled in the OFF and ON states so that none of the MOS devices 11, 12 will breakdown. $V_{DD}$ is the constant supply voltage at the LDO output. When $Vinp=V_{DD}$, $Vinn=V_{REGN}$, the output of CMOS inverter 17 is $V_{REGP}$ and the output of CMOS inverter 16 is 0V. If $V_{DD}=3.6V$, $V_{REGP}=0.8V$, and $V_{REGN}=2.8V$, $V_{SG}$ of PMOS switch 7 equals $V_{DD}-V_{REGP}=2.8V$ which makes it ON. On the contrary, $V_{GS}$ of NMOS switch 6 equals 0V which makes it OFF. Therefore, the output voltage $V_{out}=V_{DD}$. In this case, all transistors in the circuit 10 are protected against drain-gate and source-gate breakdown voltage. The maximum drain-gate or drain-source voltage is always $V_{DD}-V_{REGP}$ or $V_{REGN}$ which is 2.8V.

Figure 4:
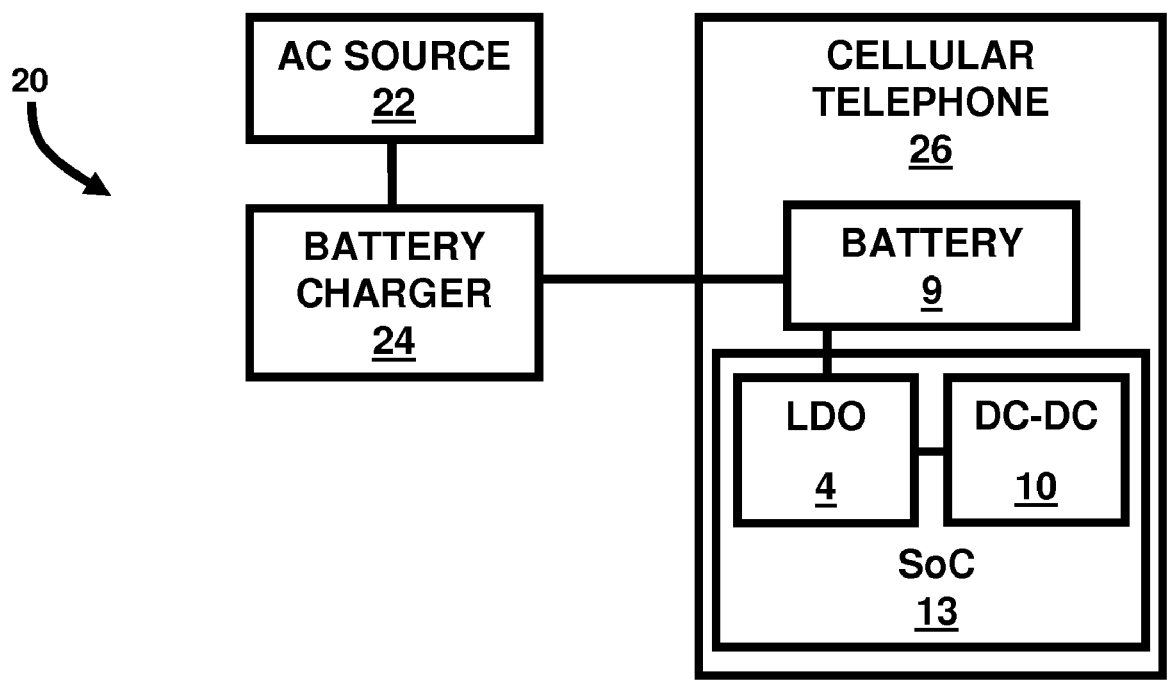
FIG. 4 is a schematic diagram of a power management system according to an embodiment herein.

In accordance with the embodiments herein, FIG. 4 (with reference to FIGS. 2 and 3) illustrates a communications system 20 comprising an AC source 22; a battery charger 24; and a cellular telephone 26, wherein the cellular telephone 26 comprises a battery 9 adapted to produce a battery voltage; and a single system on-chip (SoC) integrated circuit chip 13 comprising a LDO regulator 4 operatively connected to the battery 9 and adapted to provide a constant supply voltage from the battery voltage; and a DC-DC converter 10 operatively connected to the LDO regulator 4, wherein the DC-DC converter 10 is adapted to step down the constant supply voltage to a lower voltage level.

In the power-down mode, the DC-DC converter design is still challenging. The device (i.e., cellular telephone) 26 may be powered down while the battery charger 24 is still plugged to the AC source (outlet) 22, as shown in FIG. 4. This means that the battery voltage can be up to 5.5V even in the power-down mode. Therefore, CMOS transistors must be protected against drain-gate, and source-gate breakdown voltage. In this mode, the LDO output voltage is weakly biased, using a resistive divider 19, to half the battery voltage (max of 2.75V) which is a safe level for the transistors of the LDO 4 and the DC-DC converter 10.

The embodiments herein can be used in any portable applications where power efficiency, form factor, and cost are of particular importance. Moreover, the circuit 1 provides a significant cost reduction compared to the conventional solutions. Alternatively, the circuit 1 can be used in any application where high power efficiency and low-voltage technology are required. The LDO 4 is used to drop the battery voltage to 3.6V where the DC-DC converter 10 can operate. The low efficiency of the LDO 4 when the battery voltage is high (during charging) is not an issue since the battery charger 24 (i.e., cell phone battery charger 24) is connected to an AC outlet 22. During normal operation where the battery voltage is approximately 3.6V, the LDO efficiency is very high.

FIG. 5, with reference to FIGS. 2 through 4, is a flow diagram illustrating a method of performing power management of a cellular telephone 26 according to an embodiment herein, wherein the method comprises using (51) a battery 9 to produce a battery voltage; operatively connecting (53) a LDO regulator 4 to the battery 9; using (55) the LDO regulator 4 to provide a constant supply voltage from the battery voltage; operatively connecting (57) a DC-DC converter 10 to the LDO regulator 4; and using (59) the DC-DC converter 10 to step down the constant supply voltage to lower voltage level, wherein the LDO regulator 4 and the DC-DC converter 10 are embedded on a single integrated circuit chip 13.

Furthermore, the constant supply voltage equals 3.6V at an output of the LDO 4, and wherein the constant supply voltage is applied to an input of the DC-DC converter 10. Moreover, the battery voltage equals at most 5.5V in the cellular telephone 26. The method further comprises attaching the cellular telephone 26 to a battery charger 24; and attaching the battery charger 24 to an AC source 22, wherein the cellular telephone 26 is adapted to be in the power-down mode while the battery charger 24 is plugged to the AC source 22. Additionally, the method further comprises using a resistive divider 19 to weakly bias the constant supply voltage in order to half the battery voltage, wherein the battery voltage is at most 2.75V. Preferably, the DC-DC converter 10 comprises a pair of CMOS switches 11, 12 and a PWM 15 adapted to provide pulse signals to drive the CMOS switches 11, 12.

By setting an LDO 4 constant supply voltage, which is driven from the battery voltage, to 3.6V, then a DC-DC converter 10 can be used to generate the desired output level. Having a fixed 3.6V level at the input of the DC-DC converter 10 simplifies its design. Moreover, the embodiments herein makes it possible to integrate DC-DC converters 10 with digital CMOS cores in a SoC design. This results in significant reduction of the overall system cost.

The techniques provided by the embodiments herein may be implemented on an IC chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An electrical circuit comprising:
   a battery adapted to produce a battery voltage;
   a low dropout (LDO) regulator operatively connected to said battery and adapted to provide a constant supply voltage from said battery voltage; and
   a DC-DC converter operatively connected to said LDO regulator, wherein said DC-DC converter is adapted to step down said constant supply voltage to a lower voltage level,
   wherein said LDO regulator and said DC-DC converter are embedded on a single integrated circuit, and
   wherein said LDO is adapted to keep said constant supply voltage being input to said DC-DC converter at 3.6V.

2. The electrical circuit of claim 1, wherein said constant supply voltage equals 3.6V at an output of said LDO, and wherein said constant supply voltage is applied to an input of said DC-DC converter.

3. The electrical circuit of claim 1, wherein said battery voltage equals at most 5.5V when said battery is being charged by an AC power source.

4. The electrical circuit of claim 1, further comprising an alternating current (AC) source that charges said battey.

5. The electrical circuit of claim 1, wherein said LDO is adapted to drop said battery voltage from 5.5V to 3.6V.

6. The electrical circuit of claim 1, wherein said DC-DC converter comprises:
   a pair of complementary metal oxide semiconductor (CMOS) switches; and
   a pulse width modulator (PWM) adapted to provide pulse signals to drive said CMOS switches.

7. A communications system comprising:
   an alternating current (AC) source;
   a battery charger; and
   a cellular telephone comprising:
      a battery adapted to produce a battery voltage; and
      a single system on-chip (SoC) integrated circuit chip comprising:
         a low dropout (LDO) regulator operatively connected to said battery and adapted to provide a constant supply voltage from said battery voltage; and
         a DC-DC converter operatively connected to said LDO regulator, wherein said DC-DC converter is adapted to step down said constant supply voltage to a lower voltage level.

8. The communications system of claim 7, wherein said constant supply voltage equals 3.6V at an output of said LDO, and wherein said constant supply voltage is applied to an input of said DC-DC converter.

9. The communications system of claim 7, wherein said battery voltage equals at most 5.5V when said battery is being charged by said AC source.

10. The communications system of claim 7, wherein said LDO is adapted to keep said constant supply voltage being input to said DC-DC converter at 3.6V.

11. The communications system of claim 7, wherein said LDO is adapted to drop said battery voltage from 5.5V to 3.6V.

12. The communications system of claim 7, wherein said DC-DC converter comprises:
   a pair of complementary metal oxide semiconductor (CMOS) switches; and
   a pulse width modulator (PWM) adapted to provide pulse signals to drive said CMOS switches.

13. The communications system of claim 7, wherein said cellular telephone is adapted to be in a power-down mode while said battery charger is plugged to said AC source.

14. A method of performing power management of a cellular telephone, said method comprising:
   using a battery to produce a battery voltage;
   operatively connecting a low dropout (LDO) regulator to said battery;
   using said LDO regulator to provide a constant supply voltage from said battery voltage;
   operatively connecting a DC-DC converter to said LDO regulator; and
   using said DC-DC converter to step down said constant supply voltage to a lower voltage level,
   wherein said LDO regulator and said DC-DC converter are embedded on a single integrated circuit chip, and
   wherein said LDO is adapted to keep said constant supply voltage being input to said DC-DC converter at 3.6V.

15. The method of claim 14, wherein said constant supply voltage equals 3.6V at an output of said LDO, and wherein said constant supply voltage is applied to an input of said DC-DC converter.

16. The method of claim 14, wherein said battery voltage equals at most 5.5V in said cellular telephone.

17. The method of claim 14, further comprising providing an alternating current (AC) source and a battery charger.

18. The method of claim 14, wherein said LDO is adapted to drop said battery voltage from 5.5V to 3.6V.

19. The method of claim 17, wherein said cellular telephone is adapted to be in a power-down mode while said battery charger is plugged to said AC source.

20. The method of claim 14, wherein said DC-DC converter comprises:
 a pair of complementary metal oxide semiconductor (CMOS) switches; and
 a pulse width modulator (PWM) adapted to provide pulse signals to drive said CMOS switches.

* * * * *